United States Patent
Hotta et al.

(10) Patent No.: US 10,592,327 B2
(45) Date of Patent: Mar. 17, 2020

(54) APPARATUS, SYSTEM, AND METHOD FOR ANALYZING LOGS

(71) Applicant: FUJITSU LIMITED, Kawasaki-shi, Kanagawa (JP)

(72) Inventors: Yuuji Hotta, Kawasaki (JP); Takeshi Yasuie, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 196 days.

(21) Appl. No.: 15/922,373

(22) Filed: Mar. 15, 2018

(65) Prior Publication Data

US 2018/0285184 A1 Oct. 4, 2018

(30) Foreign Application Priority Data

Mar. 28, 2017 (JP) ................................. 2017-062208

(51) Int. Cl.
*G06F 11/00* (2006.01)
*G06F 11/07* (2006.01)
*G06F 11/34* (2006.01)

(52) U.S. Cl.
CPC ........ *G06F 11/079* (2013.01); *G06F 11/0709* (2013.01); *G06F 11/0751* (2013.01); *G06F 11/3409* (2013.01); *G06F 11/3447* (2013.01); *G06F 11/3495* (2013.01); *G06F 2201/835* (2013.01)

(58) Field of Classification Search
CPC ............... G06F 11/0751; G06F 11/079; G06F 11/0787; G06F 11/3452; G06F 11/3476; G06F 11/3072; G06F 11/34
See application file for complete search history.

(56) References Cited

U.S. PATENT DOCUMENTS

| | | | | |
|---|---|---|---|---|
| 7,702,714 | B2 * | 4/2010 | Ide | G06F 17/18 708/422 |
| 2011/0314148 | A1 * | 12/2011 | Petersen | G06F 11/3476 709/224 |
| 2012/0005542 | A1 * | 1/2012 | Petersen | G06F 11/0709 714/48 |
| 2013/0159778 | A1 | 6/2013 | Yabuki | |
| 2015/0026521 | A1 | 1/2015 | Yabuki | |
| 2015/0254158 | A1 * | 9/2015 | Puri | G06F 11/3476 714/37 |

FOREIGN PATENT DOCUMENTS

| WO | WO 2012/086824 A1 | 6/2012 |
|---|---|---|
| WO | WO 2013/111560 A1 | 8/2013 |

* cited by examiner

*Primary Examiner* — Charles Ehne
(74) *Attorney, Agent, or Firm* — Staas & Halsey LLP

(57) ABSTRACT

A processor calculates a correlation between a first data item and a second data item, based on values of the first data item in a first log and values of the second data item in a second log, and determines an influence direction by comparing values of a first chronological item with values of a second chronological item. The processor collects third and fourth logs respectively generated later than the first and second logs. The processor determines whether the correlation holds with respect to values of the first data item in the third log and values of the second data item in the fourth log, and outputs an anomaly report, when the correlation does not hold, to indicate which of the first and second data items is a cause data item (i.e., the source of an anomaly), based on the influence direction.

5 Claims, 14 Drawing Sheets

FIG. 5

CONFIGURATION TABLE 131

| LOG NAME | SERVER NAME | EVENT TYPE | KEY FLAG |
|---|---|---|---|
| AP ACCESS LOG | AP SERVER | ISOLATE EVENTS | YES |
| METHOD LOG | AP SERVER | GROUP EVENTS | NO |
| SQL LOG | DATABASE SERVER | ISOLATE EVENTS | NO |
| FIRST RESOURCE LOG | WEB SERVER | REGULAR EVENTS | NO |
| SECOND RESOURCE LOG | AP SERVER | REGULAR EVENTS | NO |

FIG. 6

LOG STORAGE UNIT — 122

AP ACCESS LOG — 132

| TIME | PROCESSING TIME | URL | REQUEST ID |
|---|---|---|---|
| 2016-09-27 13:30:10 | 355 | /a?f=i | req121 |
| 2016-09-27 13:30:20 | 482 | /a?x=1 | req123 |

METHOD LOG — 133

| TIME | METHOD GROUP | REQUEST ID |
|---|---|---|
| 2016-09-27 13:30:11 | s2m1=0, s2m2=3 | req121 |
| 2016-09-27 13:30:21 | s2m1=1, s2m2=4 | req123 |

SQL LOG — 134

| TIME | QUERY | REQUEST ID |
|---|---|---|
| 2016-09-27 13:30:11 | select C2 from T1 where ... | req121 |
| 2016-09-27 13:30:22 | select C1 from T1 where ... | req123 |

FIRST RESOURCE LOG — 135

| TIME | CPU USAGE | RAM USAGE |
|---|---|---|
| 2016-09-27 13:30:12 | 5.8 | 55 |
| 2016-09-27 13:30:22 | 6 | 56 |

SECOND RESOURCE LOG — 136

| TIME | CPU USAGE | RAM USAGE |
|---|---|---|
| 2016-09-27 13:30:12 | 27 | 215 |
| 2016-09-27 13:30:22 | 28 | 220 |

FIG. 7

FIRST AGGREGATED LOG TABLE

| s1cpu | s1ram | s2cpu | s2url | s2par | s2res | s2m1 | s2m2 | s3sql─137 |
|---|---|---|---|---|---|---|---|---|
| 5.8 | 55 | 27 | /a | f=i | 355 | 0 | 3 | select C2 from T1 where ... |
| 6 | 56 | 28 | /a | x=1 | 482 | 1 | 4 | select C1 from T1 where ... |
| ... | ... | ... | ... | ... | ... | ... | ... | ... |

FIG. 8

SECOND AGGREGATED LOG TABLE

| TIME #1 | s1cpu | s1ram | TIME #2 | s2cpu | TIME #3 | s2url | s2par | s2res |
|---|---|---|---|---|---|---|---|---|
| - | 5.8 | 55 | - | 27 | 2016-09-27 13:30:10 | /a | f=i | 355 |
| - | 6 | 56 | - | 28 | 2016-09-27 13:30:20 | /a | x=1 | 482 |
| ... | ... | ... | ... | ... | ... | ... | ... | ... |

| TIME #4 | s2m1 | s2m2 | TIME #5 | s3sql |
|---|---|---|---|---|
| 2016-09-27 13:30:11 | 0 | 3 | 2016-09-27 13:30:11 | select C2 from T1 where ... |
| 2016-09-27 13:30:21 | 1 | 4 | 2016-09-27 13:30:22 | select C1 from T1 where |
| ... | ... | ... | ... | ... |

MODEL STORAGE UNIT 127

CORRELATION TABLE 141

| DATA ITEM #1 | DATA ITEM #2 | CONTEXT | SAMPLE SIZE | CORRELATION COEFFICIENT | CAUSALITY ID |
|---|---|---|---|---|---|
| s2url | s2res | - | 100,000 | 0.86 | - |
| s2m2 | s3sql | s2par:x=1 | 5,000 | 0.81 | 1 |
| ... | ... | ... | ... | ... | ... |

CAUSALITY TABLE 142

| CAUSALITY ID | CAUSE ITEM | EFFECT ITEM | CONTEXT |
|---|---|---|---|
| 1 | s2m2 | s3sql | s2par:x=1 |
| ... | ... | ... | ... |

FIG. 10

FAILURE REPORT SCREEN

ANOMALOUS ITEMS =5

| ANOMALOUS ITEM | AVERAGE | CONDITIONS | CAUSAL RELATIONSHIP |
|---|---|---|---|
| s2m2 | 4 | s2par:x=4 | PRIMARY CAUSE ↓ |
| s3sql | 12 | s2par:x=4 | EFFECT ↓  CAUSE ↓ |
| s2res | 1482 | s2par:x=4 | EFFECT ↓ |
| ... | ... | ... | ... |

APPARATUS, SYSTEM, AND METHOD FOR ANALYZING LOGS

CROSS-REFERENCE TO RELATED APPLICATION

This application is based upon and claims the benefit of priority of the prior Japanese Patent Application No. 2017-062208, filed on Mar. 28, 2017, the entire contents of which are incorporated herein by reference.

FIELD

The embodiments discussed herein relate to an apparatus, system, and method for analyzing logs.

BACKGROUND

In an information processing system, each constituent device creates an operation log to record its activities. Such logs are collected and analyzed to automatically detect failure in the system. Anomaly analysis is one of the methods used to discover a failure from collected logs. This method does not rely on manual definition of failure-indicating log conditions, but analyzes logs collected from a properly working system and recognizes normal characteristics of logs. The method detects a failure when a newly collected log exhibits an unusual tendency against the normal one. In one anomaly analysis, a correlation between different data items contained in logs is calculated in normal situations. If this normal correlation does not hold in a newly collected log, it is interpreted as a sign of failure.

For example, one proposed operation management device is designed to detect failure on the basis of a correlation model that represents correlations of performance values in normal conditions. More specifically, the proposed operation management device measures the values of several performance metrics (e.g., processor usage rate, memory consumption, and disk usage) in normal conditions and formulates therefrom a correlation model representing a correlation between two different performance metrics. The operation management device also keeps track of the latest values of those performance metrics in the light of the correlation that the correlation model indicates, thereby watching whether any performance values violate their normal correlation. The proposed operation management device locates the cause of a failure, based on which pair of performance metrics are violating its normal correlation.

In the case where two or more correlations are violated at the same time, the above operation management device counts the number of violated correlations that involves each performance metric. Then, based on the counted numbers, the operation management device identifies a performance metric that resides at the center of distribution of violated correlations and uses the identified central metric in the subsequent process of troubleshooting.

International Publication Pamphlet No. WO2012/086824
International Publication Pamphlet No. WO2013/111560

Failure at a single particular place may cause the resulting logs to exhibit a chain of abnormal variations in the values of data items. For example, a failure in a server may cause a change in the operating status of the server itself or in some information handling processes running on the server, and this change may further lead to a change in another server's operating status or information handling processes. It is therefore possible that violation is observed in multiple correlations at the same time. The conventional anomaly analysis methods are, however, unable to determine which data item is closest to the cause of failure because they are only capable of detecting multiple data items that are experiencing violation of correlations. In other words, the conventional anomaly analysis methods have a difficulty in properly locating the real cause of a failure, thus failing to reduce the load of troubleshooting.

The techniques disclosed in International Publication Pamphlet No. WO2013/111560 estimate the cause of a fault by determining a data item that is located at the central position of violated correlations. Violation of correlations may, however, occur in a chained fashion. This means that the data item at the central position is not always the closest to the cause of the failure.

SUMMARY

In one aspect, there is provided a non-transitory computer-readable storage medium storing therein an analyzing program that causes a computer to execute a process including: collecting a first log including a plurality of first records corresponding to a plurality of first processing events and a second log including a plurality of second records corresponding to a plurality of second processing events, each of the plurality of first records including a first data item that indicates a value pertaining to one of the plurality of first processing events and a first chronological item that indicates an occurrence time of the one of the plurality of first processing events, each of the plurality of second records including a second data item that indicates a value pertaining to one of the plurality of second processing events and a second chronological item that indicates an occurrence time of the one of the plurality of second processing events; calculating a first correlation between the first data item and the second data item by comparing, for each of two or more first records in the first log, a value of the first data item included in the first record and a value of the second data item included in a second record corresponding to the first record in the second log; determining a first influence direction between the first data item and the second data item by comparing, for each of the two or more first records, a value of the first chronological item included in the first record and a value of the second chronological item included in the second record corresponding to the first record; collecting a third log including a plurality of third records each including the first data item and a fourth log including a plurality of fourth records each including the second data item, the third log being generated later than the first log, the fourth log being generated later than the second log; and determining whether the first correlation holds with respect to the first data item and the second data item by comparing, for each of two or more third records in the third log, a value of the first data item included in the third record and a value of the second data item included in a fourth record corresponding to the third record in the fourth log, and outputting an anomaly report when the first correlation does not hold, the anomaly report indicating which of the first data item and second data item is a cause data item, the cause data item being a source of an anomaly and determined based on the first influence direction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a configuration table;

FIG. 6 illustrates an example of collected logs;

FIG. 7 illustrates an example of a first aggregated log table;

FIG. 8 illustrates an example of a second aggregated log table;

FIG. 9 illustrates an example of a correlation table and a causality table;

FIG. 10 illustrates an example of a failure report screen;

DESCRIPTION OF EMBODIMENTS

Several embodiments will be described below with reference to the accompanying drawings.

(a) First Embodiment

Figure 1:
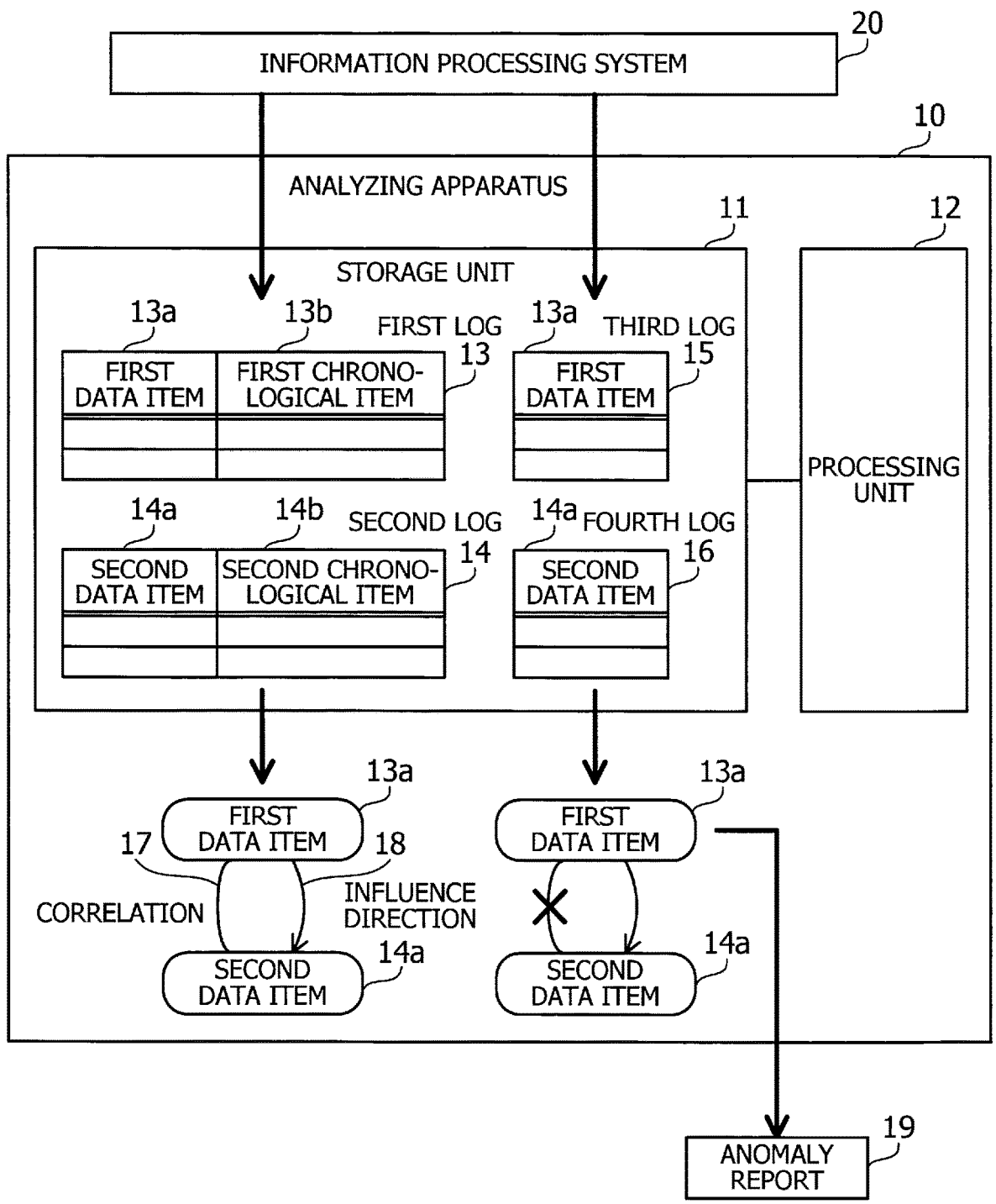
FIG. 1 illustrates an example of an analyzing apparatus according to a first embodiment.

This part (a) describes a first embodiment, with reference to FIG. 1 illustrating an example of an analyzing apparatus according to the same. The illustrated analyzing apparatus 10 watches an information processing system 20 and, if any failure is found, outputs information for use in troubleshooting. Specifically, the analyzing apparatus 10 collects operation logs from the information processing system 20 and performs an anomaly analysis to detect anomalies in the collected logs and output an anomaly report. The analyzing apparatus 10 may be a client device, or may be a server device.

The analyzing apparatus 10 includes a storage unit 11 and a processing unit 12. The storage unit 11 may be made up of volatile semiconductor memories, such as random access memories (RAM) or of non-volatile storage devices, such as hard disk drives (HDD) and flash memories. The processing unit 12 may be a central processing unit (CPU), digital signal processor (DSP), or any other processor circuitry. The processing unit 12 may also include electronic circuits designed for special purposes, such as an application specific integrated circuit (ASIC) and a field-programmable gate array (FPGA). The processor circuitry executes programs stored in RAM or other memory (or even in the storage unit 11). The programs include an analysis program. A system of two or more processors may be referred to as a "multiprocessor system" or simply a "processor."

The analyzing apparatus 10 collects a first log and a second log 14 from the information processing system 20 and stores them into the storage unit 11. The first and second logs 13 and 14 have been created by, for example, server computers that belong to the information processing system 20. The first and second logs 13 and 14 may be created at different source devices, or may come from a single source device. The first log 13 includes one or more records each produced in connection with a first processing event. Specifically, each record in the first log 13 is formed from a first data item 13a and a first chronological item 13b. The first data item 13a indicates a value or values pertaining to a first processing event, and the first chronological item 13b indicates the occurrence time of that first processing event. The second log 14 includes one or more records each produced in connection with a second processing event. Specifically, each record in the second log 14 is formed from a second data item 14a and a second chronological item 14b. The second data item 14a indicates a value or values pertaining to a second processing event, and the second chronological item 14b indicates the occurrence time of that second processing event.

The aforementioned first and second events may refer to, for example, execution of a particular information handling process within the information processing system 20, such as receiving request messages, calling methods, and issuing queries to a database. The first and second data items 13a and 14a indicate, for example, the following data: parameter values that a request message carried, the number of method calls that were made, the number of databases accessed, execution time of an information handling process, CPU and RAM usage at that moment, and other metrics of information processing activities.

The analyzing apparatus 10 further collects a third log 15 and a fourth log 16, after the first and second logs 13 and 14 described above, from the information processing system 20 and stores them into the storage unit 11. The source devices of the third and fourth logs 15 and 16 may be different from those of the preceding first and second logs 13 and 14. Alternatively, the third and fourth logs 15 and 16 may come from the same source devices as the preceding first and second logs 13 and 14. The third log 15 is created later than the first log 13 by a device whose functions are equivalent or similar to those in the source device of the first log 13. Likewise, the fourth log 16 is created later than the second log 14 by a device whose functions are equivalent or similar to those in the source device of the second log 14. For example, the first and second logs 13 and 14 are created during a test run of the information processing system 20, while the third and fourth logs 15 and 16 are created when the system is in service.

The third log 15 includes one or more records generated in connection with first processing events. Each record in the third log 15 includes the first data item 13a as in the first log 13, and may further include the first chronological item 13b and thus have the same format as the first log 13. Each record in the fourth log 16 includes the second data item 14a as in the second log 14, and may further include the second chronological item 14b and thus have the same format as the second log 14.

Upon collection of first and second logs 13 and 14 from the information processing system 20, the processing unit 12 calculates a correlation 17 between their first and second data items 13a and 14a. Specifically, the correlation 17 is calculated on the basis of values of the first data item 13a in records of the first log 13 and values of the second data item 14a in records of the second log 14. The correlation 17 may include a correlation coefficient between values of the first data item 13a and values of the second data item 14a. The correlation 17 may be a conditional correlation, meaning that a strong correlation exists between the first and second data items 13a and 14a only when a specific condition holds true with respect to the values of some other data items that the first and second logs 13 and 14 may include.

Upon collection of first and second logs 13 and 14, the processing unit 12 also determines an influence direction 18 between their first and second data items 13a and 14a. Specifically, this influence direction 18 is determined on the basis of comparison between values of the first chronological item 13b in records of the first log 13 and values of the second chronological item 14b in records of the second log 14. The influence direction 18 indicates in which direction a variation of data item values propagates. In other words, the influence direction 18 indicates a causal relationship, or causality, between two data items (i.e., one data item is the "cause" and the other data item is the "effect"). When such an influence direction 18 is determined, one of the first and second data items 13a and 14a is referred to as the "cause data item" and the other of them is referred to as the "effect data item." When, for example, every record in the first log 13 is dated earlier than its corresponding record in the second log 14, the processing unit 12 determines that the influence direction 18 goes from the first data item 13a to the second data item 14a.

Afterwards, the processing unit 12 examines third and fourth logs 15 and 16 newly collected from the information processing system 20, with reference to the previously calculated correlation 17, so as to detect a failure in the information processing system 20. Specifically, the processing unit 12 determines whether the correlation 17 still holds between values of the first data item 13a in records of the third log 15 and values of the second data item 14a in records of the fourth log 16. If the correlation 17 does not hold, the processing unit 12 interprets it as an indication of some failure in the information processing system 20. Upon detection of a failure, the processing unit 12 then checks the previously determined influence direction 18 to determine which of the first and second data items 13a and 14a is the cause data item. The term "cause data item" refers herein to one data item that experienced an abnormal variation in its values earlier than the other data item. In other words, the cause data item is closer to the cause of the failure.

Suppose, for example, that the influence direction 18 goes from the first data item 13a to the second data item 14a. In this case, the processing unit 12 determines that the first data item 13a is acting as the cause data item in this failure. The processing unit 12 may calculate two or more correlations in different combinations of data items and may detect concurrent violation of those correlations. When this is the case, the processing unit 12 makes a search for influence directions of individual violated correlations. The processing unit 12 may then combine the found influence directions into a single one, thus determining which data item is the closest to the failure. Here the closest data item may be referred to as the "primary cause data item."

The processing unit 12 outputs an anomaly report to indicate the cause data items that have been determined above. For example, the processing unit 12 outputs an anomaly report 19 on a display device connected to the analyzing apparatus 10 or the like. In the first embodiment described above, the proposed analyzing apparatus 10 is configured to provide the functions of calculating a correlation 17 and determining its influence direction 18, as well as the functions of generating an anomaly report 19. The first embodiment may, however, be modified to implement these two classes of functions in two separate apparatuses. In that case, one apparatus would inform the other apparatus of a correlation 17 and its influence direction 18.

In operation of the first embodiment, the proposed analyzing apparatus 10 analyzes first and second logs 13 and 14 not only to calculate a correlation 17 between a first data item 13a and a second data item 14a, but also to determine the direction of influence between the same. If some later logs 15 and 16 indicate violation of the correlation 17, then the analyzing apparatus 10 refers to the influence direction 18 to determine the cause data item of that violation.

Without the information about influence directions, the mere fact of a violated correlation 17 would not tell which of the first and second data items 13a and 14a concerned is more strongly related to the cause of the current failure. The influence direction 18 described above makes it possible to identify the data item that is closer to the cause. This is also true in the case where the logs violate two or more correlations including the correlation 17. The proposed analyzing apparatus 10 therefore permits the user one to narrow down the possible causes of a problem more efficiently, thus alleviating the load of troubleshooting.

(b) Second Embodiment

Figure 2:
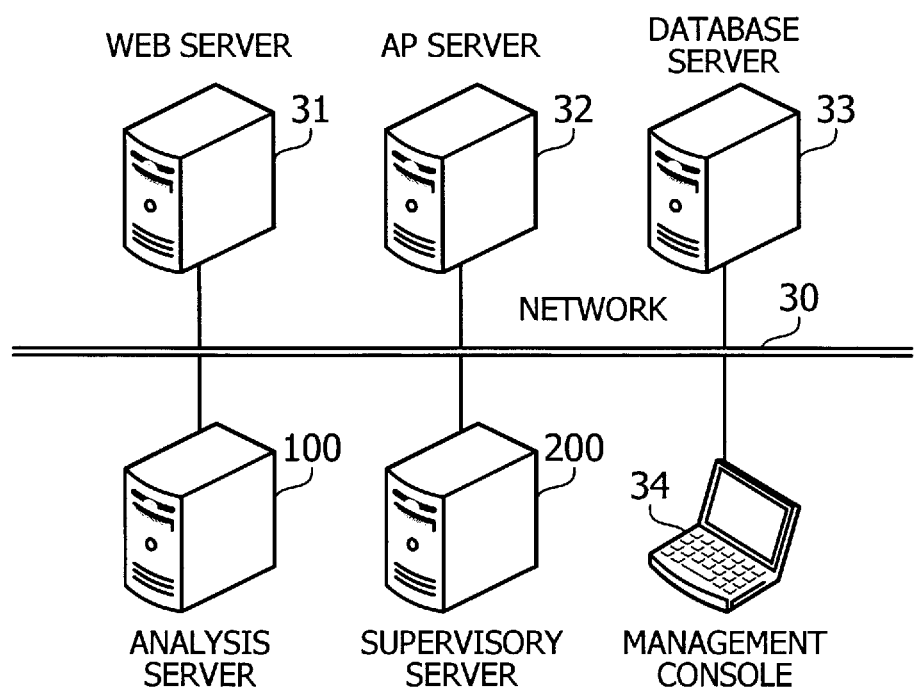
FIG. 2 illustrates an example of an information processing system according to a second embodiment.

This part (b) describes a second embodiment, with reference to FIG. 2 that illustrates an example of an information processing system according to the same. The illustrated information processing system includes functions for automatically detecting failure through an anomaly analysis and provides its system administrator with helpful information for troubleshooting. Specifically, this information processing system includes, among others, several servers for business-related services, such as a web server 31, an application server (AP server) 32, and a database server 33. The information processing system also includes a management console 34, an analysis server 100, and a supervisory server 200. The web server 31, AP server 32, database server 33, management console 34, analysis server 100, and supervisory server 200 are all connected to a network 30.

The web server 31 is a server computer that communicates with client computers (not illustrated) using the Transmission Control Protocol (TCP)/Internet Protocol (IP), HyperText Transfer Protocol (HTTP), and the like. Specifically, the web server 31 receives a request message from a client computer and requests the AP server 32 to execute application processing relevant to the received request. The AP server 32 returns result data of the application processing to the web server 31, and the web server 31 then sends the requesting client computer a response message created from the result data.

The AP server 32 is a server computer configured to execute application processing according to application programs upon request from the web server 31. Application processing may include calls for one or more methods, or functions. Application processing may also include requests for database access (i.e., request the database server 33 to make access to its local databases). The AP server 32 executes application processing by using data and other things supplied from the database server 33. Upon completion, the AP server 32 returns result data to the web server 31.

The database server 33 is a server computer with non-volatile storage devices to accommodate databases and permit access from the AP server 32. For example, the AP server 32 may request database operations, such as adding a new data entry to a database, changing or deleting some existing data entries in a database, and searching a database for an existing data entry. The database server uses the database management system (DBMS) for management of databases. The database server 33 supports a query script language (e.g., SQL), so that other servers are able to generate a query using that language and make access to a database according to the query. The database server 33 sends result data back to the AP server 32 as a response to its access request. This result data may include data extracted from databases, besides indicating whether the requested database operation (i.e., addition, update, deletion) has successfully been finished.

The above-described web server 31, AP server 32, and database server 33 create various logs to record their respective usage of hardware resources, as well as the status of their information handling processes. For example, the AP server 32 creates an AP access log to record reception of application processing requests from the web server 31. The AP server 32 also creates a method log to record method calls performed during application processing. The database server 33 creates an SQL log to record queries issued. The web server 31 and AP server 32 create resource logs to record their CPU usage and RAM usage.

The content of some logs is associated with request messages that the web server 31 received from client computers. For example, one record in an AP access log created by the AP server 32 indicates an application processing request issued in association with a specific request message. Also, one record in a method log created by the AP server 32 indicates a method call executed in association with a specific request message. Further, one record in an SQL log created by the database server 33 indicates a query issued in association with a specific request message.

The management console 34 is a client computer used by the administrator of the illustrated information processing system. Specifically, the management console 34 receives a failure-indicating message from the supervisory server 200 when it detects a failure in the information processing system. The management console 34 outputs failure information to its local output device (e.g., displaying it on its monitor screen). The administrator may use the management console 34 to investigate the cause of the failure. For example, the management console 34 makes access to server computers, including the web server 31, AP server 32, and database server 33, in accordance with the administrator's commands, and obtains therefrom various source codes, configuration data, and detailed logs apart from the foregoing logs.

The analysis server 100 is a server computer configured to formulate "models" for use by the supervisory server 200 to detect failure. These models represent correlations between different data items (different fields) included in logs collected in normal situations. The models further indicate causal relationships between highly correlated data items. More specifically, a causal relationship between two data items indicates in which direction abnormal variations of a value would propagate; that is, which data item is the "cause" and which data item is the "effect."

The analysis server 100 collects logs from server computers, including the web server 31, AP server 32, and database server 33. The analysis server 100 analyzes the collected logs to formulate models and then sends the resulting models to the supervisory server 200. The functions of formulating models reside in a server computer as in the analysis server 100 of the second embodiment. Alternatively, these functions may also be implemented in a client computer.

The supervisory server 200 is a server computer configured to detect anomalies in the information processing system by using models created by the analysis server 100 and generate a failure-indicating message to aid the troubleshooting process. The supervisory server 200 collects the latest logs from the web server 31, AP server 32, database server 33, and other server computers. The collected logs contain values of multiple data items. The supervisory server 200 determines whether those values satisfy the correlations given by the models previously received from the analysis server 100. When the latest logs fail to satisfy one or more such correlations (i.e., when violation is found in one or more of the given correlations), the supervisory server 200 determines that the information processing system is experiencing a failure or at least exhibiting a sign of failure.

When a failure is detected, the supervisory server 200 pursues the primary cause of the failure on the basis of causal relationships that the models may indicate. The term "primary cause" refers to a particular data item that is associated with violation of correlations and deemed to be the closest to the failure source. It is possible to locate the primary cause by tracing the chain of causal relationships backward (i.e., from effect to cause), opposite to the propagation direction of unusual variations of a value. The supervisory server 200 compiles a failure-indicating message and sends it to the management console 34. This failure-indicating message names the data items pertaining to the detected violation of correlations and indicates which one is deemed to be the primary cause.

The analysis server 100 formulates models as preparatory work before putting the information processing system into service. For example, the web server 31, AP server 32, database server 33, and other server computers are subjected to a test run, and the analysis server 100 collects their logs created during the test run and uses them to formulate models before the system is put into service. The supervisory server 200 begins monitoring the system when it starts full service. For example, the supervisory server 200 keeps collecting logs during the service, from server computers including the web server 31, AP server 32, and database server 33. The supervisory server 200 checks the latest logs in light of the models to detect whether the system is experiencing any problem.

As one variation, the information processing system may change its server configuration when its service is started. For example, a test environment may be constructed from server computers that have functions corresponding to the full-service environment (i.e., the web server 31, AP server 32, and database server 33). The analysis server 100 collects logs from those server computers in the test environment and formulates models from the collected logs.

As another variation, the model formulation functions and the failure detection functions may be implemented together on a single computer, although the second embodiment provides the analysis server 100 for the former and the supervisory server 200 for the latter.

As yet another variation, the analysis server 100 may be configured to continuously update existing models even when the system is in service. For example, the analysis server 100 may collect logs, together with the supervisory server 200, from the web server 31, AP server 32 and database server 33 during the system operation. Alternatively, the analysis server 100 may receive logs that the supervisory server 200 has collected. The analysis server 100 then analyzes the received logs, update existing models, and supplies the updated models to the supervisory server 200. Upon receipt of these new models, the supervisory server 200 installs them in place of the previous models. The update cycle of models may be much longer than the intervals at which the supervisory server 200 checks presence of failure.

Figure 3:
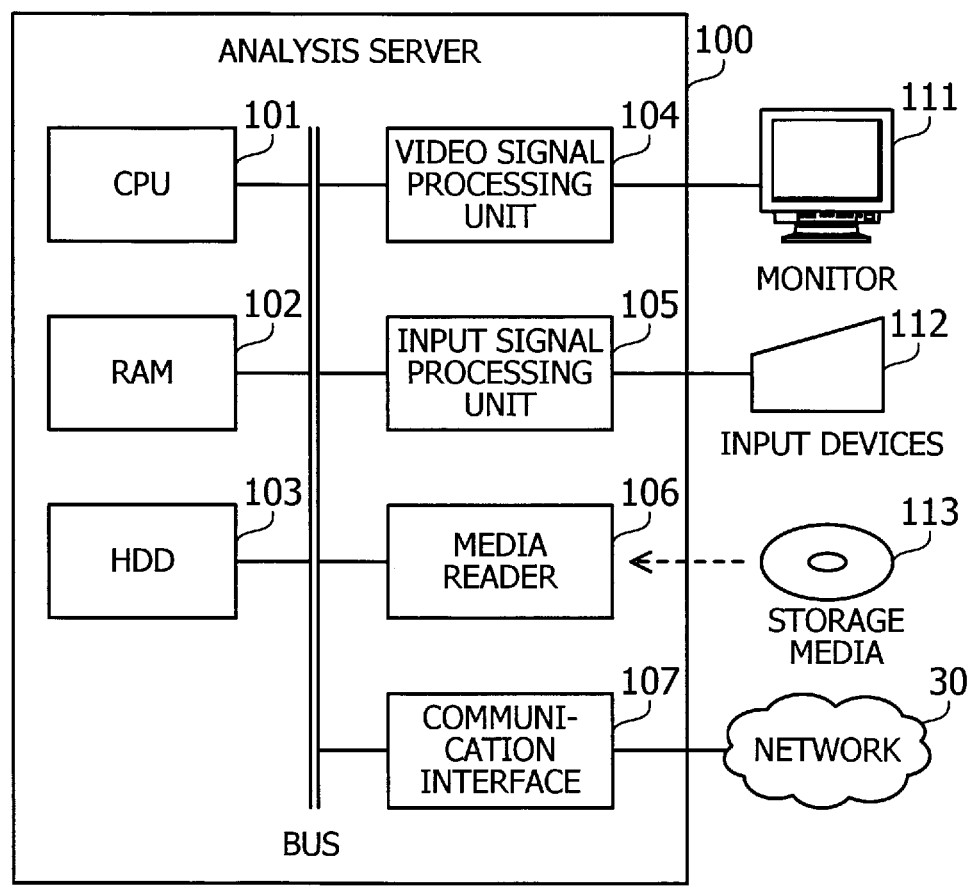
FIG. 3 illustrates an example of hardware configuration of an analysis server.

FIG. 3 illustrates an example of hardware configuration of an analysis server. The illustrated analysis server 100 is formed from a CPU 101, a RAM 102, an HDD 103, a video signal processing unit 104, an input signal processing unit 105, a media reader 106, and a communication interface 107, all of which are connected to a bus. This hardware configuration of the analysis server 100 may similarly apply to the web server 31, AP server 32, database server 33, management console 34, and supervisory server 200.

The CPU 101 is a processor that has computational circuits to execute programmed instructions. The CPU 101 reads at least part of program and data files stored in the HDD 103 and executes programs after loading them on the RAM 102. The CPU 101 may include two or more processor cores, and the analysis server 100 may include two or more processors. These processors or processor cores may execute multiple processing tasks (described later) in parallel. Such a system of processors may be referred to as a "multiprocessor system" or simply a "processor."

The RAM 102 is a volatile semiconductor memory device that temporarily stores programs for execution by the CPU 101, as well as various data objects that the CPU 101 manipulates in the course of computation. Other memory devices may be used in place of or together with the RAM 102, and the analysis server 100 may have two or more sets of such memory devices.

The HDD 103 serves as a non-volatile storage device to store program and data files of the operating system (OS), applications, and other kinds of software. The analysis server 100 may include a plurality of non-volatile storage devices, such as flash memories and solid state drives (SSD) in place of, or together with the HDD 103.

The video signal processing unit 104 produces video images in accordance with commands from the CPU 101 and outputs them on a screen of a monitor 111 coupled to the analysis server 100. The monitor 111 may be, for example, a cathode ray tube (CRT) display, liquid crystal display (LCD), plasma display panel (PDP), organic electro-luminescence (OEL) display, or other display device.

The input signal processing unit 105 receives input signals from input devices 112 coupled to the analysis server 100 and supplies them to the CPU 101. The input devices 112 include pointing devices (e.g., mouse, touchscreen, touchpad, trackball), keyboards, remote controllers, push button switches, and the like. The analysis server 100 allows connection of two or more input devices of different categories.

The media reader 106 is a device for reading programs and data stored in storage media 113. Storage media 113 include, for example, magnetic disks, optical discs, magneto-optical discs (MO), and semiconductor memory devices. Magnetic disks include flexible disks (FD) and HDDs. Optical discs include compact discs (CD) and digital versatile discs (DVD).

The media reader 106 reads programs and data out of a storage medium 113 and copies them in another storage medium (e.g., RAM 102 or HDD 103). Those programs may be executed by, for example, the CPU 101. The storage media 113 include removable and portable media and may be used for the purpose of distribution of programs and data. The storage media 113, as well as HDD 103, may be referred to as computer-readable storage media.

The communication interface 107 is connected to a network 30, allowing the CPU 101 to communicate with other apparatuses (not illustrated) via the network 30. For example, the communication interface 107 may be a wired network interface that is connected to a network device (e.g., switch) via a cable. The communication interface 107 may alternatively be a wireless network interface connected to a base station or an access point via a radio link.

Figure 4:
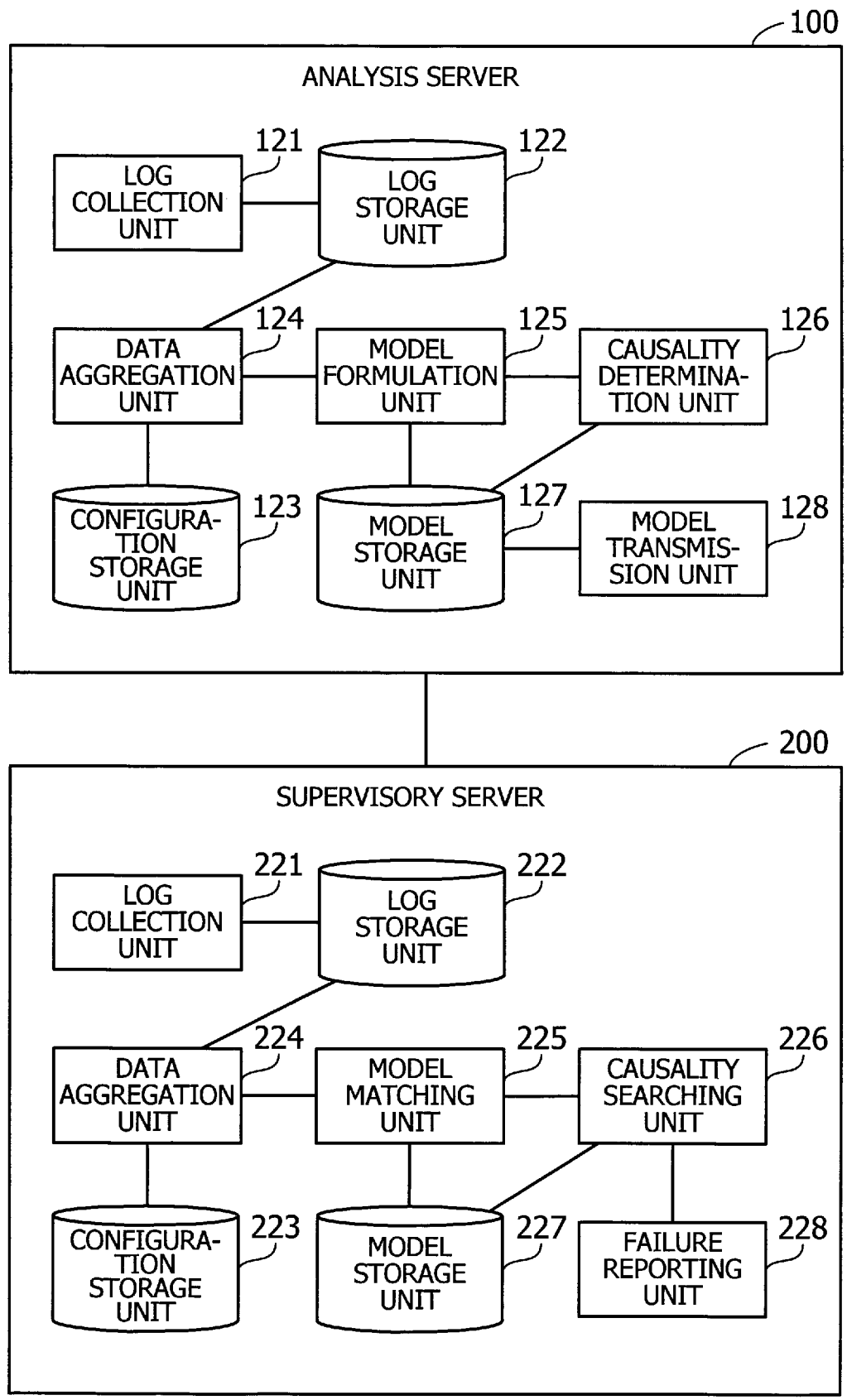
FIG. 4 is a block diagram that illustrates an example of functions provided in an analysis server and a supervisory server.

FIG. 4 is a block diagram that illustrates an example of functions provided in an analysis server and a supervisory server. The illustrated analysis server 100 includes a log collection unit 121, a log storage unit 122, a configuration storage unit 123, a data aggregation unit 124, a model formulation unit 125, a causality determination unit 126, a model storage unit 127, and a model transmission unit 128. For example, the log storage unit 122, configuration storage unit 123, and model storage unit 127 are implemented by reserving storage areas in the RAM 102 or HDD 103 (FIG. 3). The log collection unit 121, data aggregation unit 124, model formulation unit 125, causality determination unit 126, and model transmission unit 128, on the other hand, are implemented in the form of program modules.

The log collection unit 121 collects logs created in the web server 31, AP server 32, and database server 33. For example, the log collection unit 121 collects logs in the preliminary analysis phase (i.e., before the system is put into service) and stores them in the log storage unit 122. The log storage unit 122 provides a storage place for the logs collected from the web server 31, AP server 32, and database server 33.

The configuration storage unit 123 stores therein a set of configuration data for use in aggregating collected logs. The administrator of the system may prepare this configuration data on the basis of characteristics of logs to be collected. For example, the configuration data includes information that describes on what events each log will acquire a new record. Also included is information about a key log that serves as the origin point in the process of analyzing logs.

The data aggregation unit 124 creates an aggregated log by summarizing logs in the log storage unit 122, based on the configuration data stored in the configuration storage unit 123. More specifically, the data aggregation unit 124 selects one record in the key log, searches other logs to extract records pertaining to the selected record, and combines the extracted records with the selected record. The data aggregation unit 124 repeats this procedure with each individual record in the key log, thus associating the values of different data items in different logs (e.g., logs created in different server computers). As mentioned previously, some logs include records about the execution status of information handling processes, and other logs include records about the usage of hardware resources. The data aggregation unit 124 aggregates the former group of logs by extracting records pertaining to the same request message as the key log record of interest and combines them together. The data aggregation unit 124 aggregates the latter group of logs by extracting records having timestamps that are closest to the timestamp of the key log record of interest and combines them together.

The model formulation unit 125 formulates models of correlations between data items by using aggregated logs that the data aggregation unit 124 has created. Each of the formulated models describes a particular pair of data items (referred to as a "data item pair") that has a high correlation coefficient, among the data items included in the aggregated log. The model formulation unit 125 stores these models in the model storage unit 127. When evaluating the correlation of a certain data item pair, the model formulation unit 125 considers the possibility that the data item pair may exhibit a raised correlation coefficient only in a particular context (i.e., only when other data items have a particular pattern of values). Here the word "context" denotes a condition or conditions that permit two data items to have a specific correlation. In other words, a correlation coefficient is defined with respect to a specific combination of a data item pair and a context. The context may be null in the case where the correlation coefficient of a data item pair is sufficiently high regardless of other data item values.

The causality determination unit 126 adds some information about causal relationships to the models stored in the model storage unit 127, using aggregated logs created by the data aggregation unit 124. More specifically, the causality determination unit 126 analyzes an aggregated log as to a chronological relationship of a data item pair with a high correlation coefficient, based on the timestamps of two data items constituting the pair. Here, the timestamps indicate when the values of one data item were recorded, as well as when the values of the other data item were recorded. For example, the values of one data item may appear in the aggregated log always earlier than the values of the other data item. If such a relationship is observed, the causality determination unit 126 interprets it as the presence of a causal relationship, the earlier data item being the "cause" and the later data item being the "effect." It is noted, however, that not all data item pairs have a causal relationship even if they have a high correlation coefficient. Two data items are deemed to have no causal relationship when their timestamps lack any apparent regularity.

The model storage unit 127 stores models for failure detection, each representing a correlation and a causal relationship (if any) between paired data items. These models have been created by the foregoing model formulation unit 125 and causality determination unit 126 and stored in the model storage unit 127. The model transmission unit 128 transmits the models to the supervisory server 200.

The supervisory server 200 includes a log collection unit 221, a log storage unit 222, a configuration storage unit 223, a data aggregation unit 224, a model matching unit 225, a causality searching unit 226, a model storage unit 227, and a failure reporting unit 228. For example, the log storage unit 222, configuration storage unit 223, and model storage unit 227 are implemented by reserving storage areas in the RAM or HDD of the supervisory server 200. The log collection unit 221, data aggregation unit 224, model matching unit 225, causality searching unit 226, and failure reporting unit 228, on the other hand, are implemented in the form of program modules.

The log collection unit 221 continuously collects logs from the web server 31, AP server 32, and database server 33. For example, the log collection unit 221 collects logs in the operations monitoring phase (i.e., after the system is put into service) and stores them in the log storage unit 222. The log storage unit 222 provides a storage place for the logs collected from the web server 31, AP server 32, and database server 33.

The configuration storage unit 223 stores therein a set of configuration data for use in aggregating collected logs. The administrator may prepare this configuration data on the basis of characteristics of logs to be collected. The configuration data stored in the configuration storage unit 223 of the supervisory server 200 may be identical with the one stored in the configuration storage unit 123 of the analysis server 100. The data aggregation unit 224 creates an aggregated log by summarizing logs in the log storage unit 222, based on the configuration data stored in the configuration storage unit 223. The log storage unit 222 in the supervisory server 200 may perform this log aggregation in the same way as the foregoing data aggregation unit 124 does in the analysis server 100. It is noted that the data aggregation unit 224 repeats log aggregation at relatively short intervals.

The model matching unit 225 compares each aggregated log that the data aggregation unit 224 has created with models stored in the model storage unit 227, thus determining whether any one of the data item pairs concerned exhibits "violation of correlation" (or "correlation violation"). When such violation is detected in one or more data item pairs, the model matching unit 225 interprets it as indicating a failure in the information processing system. More specifically, the detection of correlation violation may be achieved as follows. The model matching unit 225 calculates a correlation coefficient of the data item pair described in each given model, using a new aggregated log that the data aggregation unit 224 has created. When the model gives a non-null context to the data item pair, the model matching unit 225 extracts aggregated-log records that match with the context and calculates a correlation coefficient from the extracted records. Some data item pair may exhibit a large distance between its current correlation coefficient and the correlation coefficient given in its relevant model. The model matching unit 225 determines that the correlation is violated in such data item pairs.

The causality searching unit 226 searches the models stored in the model storage unit 227 for a causal relationship of each correlation-violated data item pair (i.e., each data item pair whose correlation is currently violated). If this search finds a causal relationship with respect to a correlation-violated data item pair, then it means that the "cause" and "effect" data items are successfully identified. It is noted, however, that all correlation-violated data item pairs have their causal relationships defined in the models.

When correlation violation is detected in two or more data item pairs under the same context, and when their respective causal relationships are identified, the causality searching unit 226 determines the primary cause data item by consolidating causal relationships of these data item pairs and investigating which data item is the closest to the cause of the failure. The transitivity rule allows consolidating two causal relationships if the cause data item in one causal relationship corresponds to the effect data item in the other causal relationship. The topmost data item (i.e., the one at the causing end) of the consolidated causal relationship is then identified as the primary cause data item.

The model storage unit 227 provides a storage place for models that the supervisory server 200 receives from the analysis server 100. The failure reporting unit 228 generates a failure report when the model matching unit 225 has detected a failure, thus notifying the management console 34 of the detected failure. A failure report screen then pops up on the monitor of the management console 34. Alternatively, the failure reporting unit 228 may display a failure report screen on the monitor of the supervisory server 200 itself. Such failure reports indicate the item names of data items associated with violation of correlations, the tendency of values of those data items in collected logs (e.g., the average and range of their values), and the like. In the case where the causality searching unit 226 has found causal relationships, the failure reports may also include information about these causal relationships. Preferably, the failure reports identify the primary cause (fundamental cause) of the present failure.

FIG. 5 illustrates an example of a configuration table. This configuration table 131 is stored in the configuration storage unit 123 of the analysis server 100. A similar table is stored in the configuration storage unit 223 of the supervisory server 200. The illustrated configuration table 131 is formed from the following data fields: "Log Name," "Server Name," "Event Type," and "Key Flag."

The log name field contains the name of each log that the analysis server 100 and supervisory server 200 are to collect. The server name field contains the names of server computers that are supposed to output logs for collection by the analysis server 100 and supervisory server 200.

The event type field specifies log types that represent what kind of events may cause server computers to add records to their logs. Specifically, the events are classified into isolate events, group events, and regular events. Isolate events are of a log type that adds one log record for each single execution of a specific information handling process in response to a request message. Group events are of a log type that adds one log record for multiple executions of a specific information handling process in response to a request message. Regular events are of a log type that adds a log record at regular intervals, regardless of request messages.

The key flag field contains a flag that indicates whether the corresponding log is a key log or not. The key log is used as the start point of a log aggregation procedure. Usually the key log is one of the logs collected by the analysis server 100 and supervisory server 200.

As an example, the analysis server 100 and supervisory server 200 collects an AP access log from the AP server 32, a method log from the AP server 32, and an SQL log from the database server 33. The analysis server 100 and supervisory server 200 also collects a first resource log from the web server 31 and a second resource log from the AP server 32. AP access log is a log of isolate events and marked as a key log. Method log is a log of group events. SQL log is a log of isolate events. The first resource log is a log of regular events, and so is the second resource log.

FIG. 6 illustrates an example of collected logs. The illustrated log storage unit 122 stores an AP access log 132, a method log 133, an SQL log 134, a first resource log 135, and a second resource log 136. The analysis server 100 has collected these logs from the web server 31, AP server 32 and database server 33 during the preliminary analysis phase. In the operations monitoring phase, the supervisory server 200 collects a similar set of logs and stores them in its local log storage unit 222.

The AP access log 132 includes records each created in response to an application processing request from the web server 31 to the AP server 32. Specifically, each record of the AP access log 132 is formed from the following data fields: "Time," "Processing Time," "Uniform Resource Locator (URL)," and "Request ID." The time field contains a timestamp concerning the content of the record. For example, the timestamp may indicate when its request was received, when result data was returned, or when the record was created. The processing time field indicates the execution time of application processing in the AP server 32, from reception of a request to transmission of result data. The URL field contains a URL specified in a request message from a client that made the web server 31 issue the pertaining application processing request. This URL in the AP access log 132 may include, in addition to the directory name and file name, parameters used in the application processing. The request ID field contains an identifier that is given to each request message from clients.

The method log 133 includes records created on the basis of one or more method calls performed in the course of application processing by the AP server 32. Each record of the method log 133 is formed from the following data fields: "Time," "Method Group," and "Request ID." The time field contains a timestamp concerning the content of the record. For example, the timestamp may indicate when the first method call was made, when the final method call was made, or when the record was created. The method group field indicates the name of each called method and the number of calls that were made. It is noted that the AP server 32 may call two or more different methods or may call the same method two or more times during the period from reception of a request to transmission of result data. The request ID field contains an identifier that is given to each request message.

The SQL log 134 includes records created on the basis of queries issued by the database server 33. Specifically, each record of the SQL log 134 is formed from the following data fields: "Time," "Query," and "Request ID." The time field contains a timestamp concerning the content of the record. For example, the timestamp may indicate when the database server 33 accepted access from the AP server 32, when a query was generated, when access result was returned, or when the record was created. The query field contains an SQL script of the query of interest. For example, this query script may include a select statement for data search, an insert statement for addition of new data, an update statement for update of existing data, or a delete statement for deletion of existing data. The request ID field contains an identifier that is given to each request message.

The first resource log 135 includes records that indicate the usage of hardware resources in the web server 31. Specifically, each record of the first resource log 135 is formed from the following data fields: "Time," "CPU Usage," and "RAM Usage." The time field contains a timestamp concerning the content of the record. For example, this timestamp may indicate when the usage of a hardware resource was measured or when the record was created. The CPU usage field indicates a CPU usage rate in the web server 31. The RAM usage field indicates the amount of RAM space used in the web server 31. The first resource log 135 is a collection of records generated at regular intervals.

The second resource log 136 includes records that indicate the usage of hardware resources in the AP server 32. Specifically, each record of the second resource log 136 is formed from the following data fields: "Time," "CPU Usage," and "RAM Usage." The time field contains a timestamp concerning the content of the record. For example, this timestamp may indicate when the usage of a hardware resource was measured or when the record was created. The CPU usage field indicates a CPU usage rate in the AP server 32. The RAM usage field indicates the amount of RAM space used in the AP server 32. The second resource log 136 is a collection of records generated at regular intervals.

FIG. 7 illustrates an example of a first aggregated log table. In the analysis server 100, the data aggregation unit 124 formulates a first aggregated log table 137, based on the above-described logs in the log storage unit 122. In the supervisory server 200, the data aggregation unit 224 also formulates its own aggregated log table, based on the logs stored in the log storage unit 222.

The illustrated first aggregated log table 137 is the result of aggregating collected logs and thus includes all or part of the data items in those logs. One record in the first aggregated log table 137 corresponds to one record in the AP access log 132, which is designated as the key log. For example, the first aggregated log table 137 is formed from the following data fields: s1cpu, s1ram, s2cpu, s2url, s2par, s2res, s2m1, s2m2, and s3sql.

The s1cpu field of a table record stores a CPU usage rate copied from the first resource log 135, and the s1ram field stores a RAM usage value copied from the same. The s2cpu field stores a CPU usage rate copied from the second resource log 136. The s2url field stores a URL value copied from the AP access log 132, excluding its parameter part. That is, the s2url field only stores a directory name and a file name, if any. The s2par field, on the other hand, stores the parameter part of URL copied from the AP access log 132.

The s2res field of a table record stores a value of processing time copied from the AP access log 132. The s2m1 field stores the number of calls for method s2m1, where s2m1 is one of the methods recorded in the method log 133. The s2m2 field stores the number of calls for method s2m2, where s2m2 is another one of the methods recorded in the method log 133. The s3sql field stores a query copied from the SQL log 134.

The data aggregation unit 124 has created the above-described first aggregated log table 137 from collected logs in the following way. First, the data aggregation unit 124 selects one record (key log record) out of those in the AP access log 132 (key log). The data aggregation unit 124 also selects one non-key log and retrieves its event type value from the configuration table 131. In the case where the retrieved event type value indicates isolate events or group events, the data aggregation unit 124 searches the selected non-key log for records that have the same request ID as the current key log record and merges the found records with the key log record. In the case where the retrieved event type value indicates regular events, the data aggregation unit 124 searches the selected non-key log for records whose timestamps are the closest to the timestamp of the current key log record and merges the found records with the key log record. The data aggregation unit 124 performs the above operations for each record in the AP access log 132. Interrelated records are extracted from multiple logs in this way and complied into a first aggregated log table 137.

The first aggregated log table 137 permits the model formulation unit 125 to determine the correlation between data items. The causality determination unit 126, on the other hand, needs a different aggregated log table to determine the causal relationship between correlated data items.

FIG. 8 illustrates an example of a second aggregated log table. In the analysis server 100, the data aggregation unit 124 generates a second aggregated log table 138, in addition to the first aggregated log table 137 described above, based on the foregoing logs stored in the log storage unit 122. In the supervisory server 200, however, the data aggregation unit 224 does not have to generate the same kind of aggregated log tables as the second aggregated log table 138. Besides the data fields described above for the first aggregated log table 137, the second aggregated log table 138 has the following data fields: Time #1, Time #2, Time #3, Time #4, and Time #5.

The time #1 field stores a timestamp corresponding to field values of s1cpu and s1ram (i.e., timestamp recorded in the first resource log 135). The time #2 field stores a timestamp pertaining to field values of s2cpu (i.e., timestamp recorded in the second resource log 136). The time #3 field stores a timestamp pertaining to field values of s2url, s2par, and s2res (i.e., timestamp recorded in the AP access log 132). The time #4 field stores a timestamp pertaining to field values of s2m1 and s2m2 (i.e., timestamp recorded in the method log 133). The time #5 field stores a timestamp pertaining to field values of s3sql (i.e., timestamp recorded in the SQL log 134). Timestamps are inserted to the second aggregated log table 138 in this way, so that they will indicate when the values of their corresponding data items were output.

As will be described later, timestamps recorded in regular-event logs are not used for determination of causal relationships because, in general, records of regular events are generated asynchronously with those of isolate events and group events. Referring again to the example of FIGS. 5 and 6, the timestamps recorded in the first and second resource logs 135 and 136 are of no use in determining causal relationships. This means that the second aggregated log table 138 may omit timestamps of regular-event logs. For example, the time #1 field of the second aggregated log table 138 may have no values since they are timestamps in the first resource log 135. Likewise, the time #2 field may have no values since they are timestamps in the second resource log 136.

FIG. 9 illustrates an example of a correlation table and a causality table. The illustrated correlation table 141 has been generated by the model formulation unit 125, and the illustrated causality table 142 has been generated by the causality determination unit 126. That is, the correlation table 141 and causality table 142 are what have been described above as "models." The generated correlation table 141 and causality table 142 are stored in the model storage unit 127 of the analysis server 100 and also copied to the model storage unit 227 of the supervisory server 200.

The correlation table 141 is formed from the following data fields: "Data Item #1," "Data Item #2," "Context," "Sample Size," "Correlation Coefficient," and "Causality ID." The data item #1 field stores the name of one member of a data item pair, while the data item #2 field stores the name of the other member of the pair.

The context field specifies conditions that will limit the range of aggregated log records to be used to calculate a correlation coefficient. The context field may be empty or may have some relevant content. The former case means that a strong correlation exists between data item #1 and data item #2, no matter what values the other data items may have. The latter case means that the validity of a strong correlation between data item #1 and data item #2 is limited to when the values of other data items satisfy a particular condition(s). As an example, the context field may specify s2par:x=1. This means that the data item s2par (i.e., URL) contains a specific parameter name in combination with a specific parameter value as in "x=1." As another example, the context field may specify s2par:x, denoting that the data item s2par contains a specific parameter name, without specifying any particular parameter values.

The sample size field stores the number of aggregated log records used to calculate correlation coefficients. That is, the sample size means how many of the records stored in the first aggregated log table 137 match with the specified context conditions. Suppose, for example, that "s2par:x=1" is specified in the context field. The sample size in this case represents the number of records that have the value "x=1" in the data item s2par. The correlation coefficient field contains a correlation coefficient that indicates the strength of correlation between data item #1 and data item #2. Greater correlation coefficients mean stronger positive correlations. The correlation table 141 stores a collection of data item pairs whose correlation coefficients are greater than or equal to a specific threshold (e.g., 0.7). The causality ID field stores an identifier that distinguishes a specific record in the causality table 142.

The model formulation unit 125 generates a correlation table 141 from a given first aggregated log table 137 in the way described below. First, the model formulation unit 125 enumerates variations of values for each individual data item in the first aggregated log table 137 and extracts data items whose number of value variations is smaller than or equal to a threshold (e.g., data items having 20 or fewer value variations). What is referred to as "the number of value variations" may be the number of different values appearing in a data item, or may be the number of groups into which different values in a data items are classified. For example, groups may be defined as different value ranges, such as 0 to 80, 81 to 160, and 161 and above, or as different distribution bands, such as 0% to 50% and 51% to 100%. Another criterion for grouping may be the leading characters of string values. For example, one group starts with a to m, and another groups starts with n to z.

Using the data items extracted above, the model formulation unit 125 nominates a set of contextual candidates (i.e., candidates for the context field). For example, one value of one data item may be a contextual candidate. A combination of values of two or more data items may also be a contextual candidate. Further, a null context is included in the noted set of candidates.

Suppose, for example, that the number of value variations exceeds the threshold with respect to s1cpu, s1ram, s2cpu, s2res, s2m1, s2m2, and s3sql, whereas that of s2url and s2par does not. In this case, the model formulation unit 125 extracts s2url and s2par from the first aggregated log table 137. When the first aggregated log table 137 contains two values {u1, u2} in s2url and three values {p1, p2, p3} in s2par, the model formulation unit 125 nominates the following twelve candidates: { }, {u1}, {u2}, {p1}, {p2}, {p3}, {u1, p1}, {u1, p2}, {u1, p3}, {u2, p1}, {u2, p2}, and {u2, p3}.

The model formulation unit 125 extracts a data item pair by selecting two data items out of those included in the first aggregated log table 137. Then, from among the set of contextual candidates nominated above, the model formulation unit 125 selects one contextual candidate and searches the first aggregated log table 137 for records pertaining to the selected candidate. If such records are found, the model formulation unit 125 extracts from them the values of two data items constituting the noted data item pair and calculates a correlation coefficient between the two data items on the basis of the extracted item values. When this correlation coefficient is greater than or equal to a specified threshold, the model formulation unit 125 adds a new record to the correlation table 141 to register the current data item pair, context, sample size, and correlation coefficient. The model formulation unit 125 performs the above procedure for different combinations of a data item pair and a contextual candidate, thereby discovering correlations between data items.

For more efficient execution of the above-described procedure, the model formulation unit 125 may take a stepwise approach when using records in the first aggregated log table 137. For example, the model formulation unit 125 may randomly select a small number (e.g., 30) of sample records from among those pertaining to a contextual candidate and calculate an estimate of the correlation coefficient of a data item pair from those sample records. If the estimate is below a specified threshold, the model formulation unit 125 rejects the data item pair because of its weak correlation. If the estimate is greater than or equal to the threshold, then the model formulation unit 125 calculates an exact correlation coefficient by using a larger number of records than the sample records or all records that match with the current contextual candidate. For example, the above threshold for estimates may be 0.7 (the same as the threshold for exact values), 0.6 (smaller than the threshold for exact values), or 0.8 (larger than the threshold for exact values).

The second aggregated log table 138 is a superset of the first aggregated log table 137. This fact suggests that the model formulation unit 125 may use the second aggregated log table 138, instead of the first aggregated log table 137, to create a correlation table 141. In this case, the data aggregation unit 124 may be configured to create a second aggregated log table 138 only.

Referring now to the lower half of FIG. 9, the causality table 142 is formed from the following data fields: "Causality ID," "Cause Item," "Effect Item," and "Context." The causality ID field stores an identifier that distinguishes a specific record in the causality table 142. The cause item field indicates which of the two data items (i.e., #1 or #2) stored in a record of the correlation table 141 is the cause, and the effect item field indicates which of the two data items is the effect. A failure brings about abnormal variations of a value, which propagate from the cause item toward the effect item. In other words, the values change first at the cause data item and then at the effect data item. The context field indicates in what context the registered causal relationship holds true.

The causality determination unit 126 creates a causality table 142 from the second aggregated log table 138 and correlation table 141 in the following way. First, the causality determination unit 126 selects one of the correlations registered in the correlation table 141. The causality determination unit 126 then searches the second aggregated log table 138 for records that match with the context of the selected correlation and extracts two timestamps from the data item #1 field and data item #2 field of each found record. When, for example, the data item #1 field of a found record indicates s2m2 and the data item #2 field indicates s3sql, the causality determination unit 126 extracts timestamps stored in the time #4 field and time #5 field of the record.

The causality determination unit 126 compares two timestamps of data item #1 and data item #2 to discover the regularity in them. If, for example, every record found above has an earlier timestamp of data item #1 than the timestamp of data item #2, the causality determination unit 126 determines that data item #1 is the cause item and data item #2 is the effect item. If every record found above has a later timestamp of data item #1 than the timestamp of data item #2, the causality determination unit 126 determines that data item #2 is the cause item and data item #1 is the effect item. If neither of the above is true, the causality determination unit 126 concludes that there is no causal relationship between data item #1 and data item #2.

The causality determination unit 126 also negates causal relationships between two data items #1 and #2, regardless of their timestamps, if the event type of one or both of them indicates regular events. This is because of the fact that the records of regular events are created asynchronously with other log records. It is difficult to deduce the causality of data items from the timestamps of regular events.

Some data item pairs allow deducting their causal relationships from other information than timestamps. For example, a call graph may be created through a static analysis of source code of application programs. This call graph represents caller-callee relationships between different methods and thus enables the causality determination unit 126 to determine the causality of two or more data items (e.g., s2m1 and s2m2) pertaining to method calls.

The causality determination unit 126 registers the causal relationship of a correlation in the causality table 142 when it is successfully determined. The causality determination unit 126 also adds its causality ID to the correlation table 141 so as to associate the newly registered causal relationship in the causality table 142 with its corresponding record of correlation in the correlation table 141.

FIG. 10 illustrates an example of a failure report screen. The model matching unit 225 in the supervisory server 200 detects violation of correlations between different data items, based on the correlation table 141 copied from the analysis server 100. Upon detection of violation, the causality searching unit 226 in the supervisory server 200 searches the causality table 142 copied from the analysis server 100 to find out causal relationships of the correlation-violated data item pairs. The failure reporting unit 228 in the supervisory server 200 then sends a failure report to the management console 34. Based on this report, the management console 34 displays a failure report screen 231 on its monitor.

The failure report screen 231 provides information about violation of correlations between data items included in the latest logs. As an example, the illustrated failure report screen 231 first indicates the number of anomalous items, i.e., how many data items are involved in the correlation-violated data item pairs. The illustrated failure report screen 231 also gives the names of anomalous items. The failure report screen 231 further indicates the statistics of values of each anomalous item that appear in the latest collected logs. The statistics may be, for example, the average or range of anomalous item values in the logs. The failure report screen 231 further indicates in what context a close correlation is usually observed.

The failure report screen 231 further includes information about causal relationships between anomalous data items. Each causal relationship is illustrated in a visual way by designating each pertaining item as "cause" or "effect." When two or more causal relationships hold under the same conditions (i.e., in the same context), their linkage is also visualized. The beginning end of the linkage tree (i.e., the data item affected in the first place) is emphasized by the text of "Primary Cause." For example, the illustrated failure report screen 231 includes two causal relationships: one from s2m2 to s3sql, and the other from s3sql to s2res. It is possible to link these two causal relationships together, the item s2m2 being the primary cause.

The administrator sees the above failure report screen 231 and checks the data item marked "Primary Cause" in preference to other data items, so that he or she may quickly find the source of the current problem (e.g., hardware failure, incorrect software setup). In this course, the administrator may, for example, browse the configuration files and source code pertaining to the primary cause and collect detailed logs related to the primary cause.

It is noted that the failure report screen 231 omits causal relationships in the case where the correlation table 141 does not have causality IDs for correlation-violated data item pairs. It is also noted that causal relationships between anomalous items may be presented in tabular form as in the example of FIG. 10, or may be visualized in graphical form. For example, the failure report screen 231 may include a directional graph formed from nodes and arrows, where the nodes represent anomalous items and the arrows represent causal relationships.

The supervisory server 200 performs the following things to detect violation of a correlation. The data aggregation unit 224 in the supervisory server 200 creates an aggregated log table from the latest logs stored in the log storage unit 222, in the same way as the data aggregation unit 124 in the analysis server 100 creates a first aggregated log table 137. The model matching unit 225 in the supervisory server 200 selects one of the correlations registered in its own copy of the correlation table 141. The model matching unit 225 then searches the aggregated log table created by the data aggregation unit 224 for records that match with the context of the selected correlation and extracts values of data item #1 and data item #2 from the found records. From the extracted values, the model matching unit 225 calculates a correlation coefficient between data item #1 and data item #2.

The model matching unit 225 further calculates how far the calculated correlation coefficient is diverted from the proper correlation coefficient registered in the correlation table 141. If the calculated divergence is greater than or equal to a specified threshold, then the model matching unit 225 interprets it as violation of a correlation. The model matching unit 225 repeats the above operations with each registered correlation in the correlation table 141, thus identifying every correlation-violated data item pair. The presence of at least one such correlation-violated data item pair would be recognized as a sign of failure.

The divergence of two correlation coefficients is calculated on the basis of statistics. For example, the model matching unit 225 may calculate the following values:

$$z_1 = \frac{1}{2}\ln\frac{1+r_1}{1-r_1}, \quad (1)$$

$$z_2 = \frac{1}{2}\ln\frac{1+r_2}{1-r_2}$$

$$z = \sqrt{\frac{(n_1-3)(n_2-3)}{n_1+n_2-6}}(z_1-z_2) \quad (2)$$

where $r_1$ is a relevant correlation coefficient registered in the correlation table 141, $n_1$ is a relevant sample size registered in the correlation table 141, $r_2$ is a correlation coefficient calculated from the latest logs, $n_2$ is the sample size representing how many samples are used to calculate correlation coefficient $r_2$, and z is a measure of divergence. The model matching unit 225 calculates $z_1$ and $z_2$ from correlation coefficients $r_1$ and $r_2$ according to equation (1) and then divergence z from the resulting $z_1$ and $z_2$ and sample sizes $n_1$ and $n_2$ according to equation (2).

The model matching unit 225 compares the absolute value of z with a threshold of 1.96, thereby determining whether equation (3) is true. When equation (3) is true, the model matching unit 225 determines that the population correlation coefficient between the population with sample size $n_1$ and the population with sample size $n_2$ indicates difference with the significance level of 5%. In other words, the condition stated in equation (3) means that the current correlation coefficient $r_2$ is sufficiently different from the previously calculated correlation coefficient $r_1$, and thus permits the model matching unit 225 to recognize violation of the correlation of interest.

$$|z| \geq 1.96 \quad (3)$$

As one example of correlation violation, the system may experience an exceptionally large number of input and output operations or exceptionally long processing times while the CPU usage stays at the usual level. The possible causes of this case include a failure of I/O hardware and other anomaly in input and output facilities. Another example of correlation violation is the case in which some servers are making an exceptionally large number of (or an exceptionally small number of) method calls while there is a hike in the amount of data stored in the database. The possible causes of this case include a failure of I/O hardware, a problem in database software, and other anomaly in input and output facilities.

The next section of this description explains specific procedures performed by the analysis server 100 and supervisory server 200.

Figure 11:
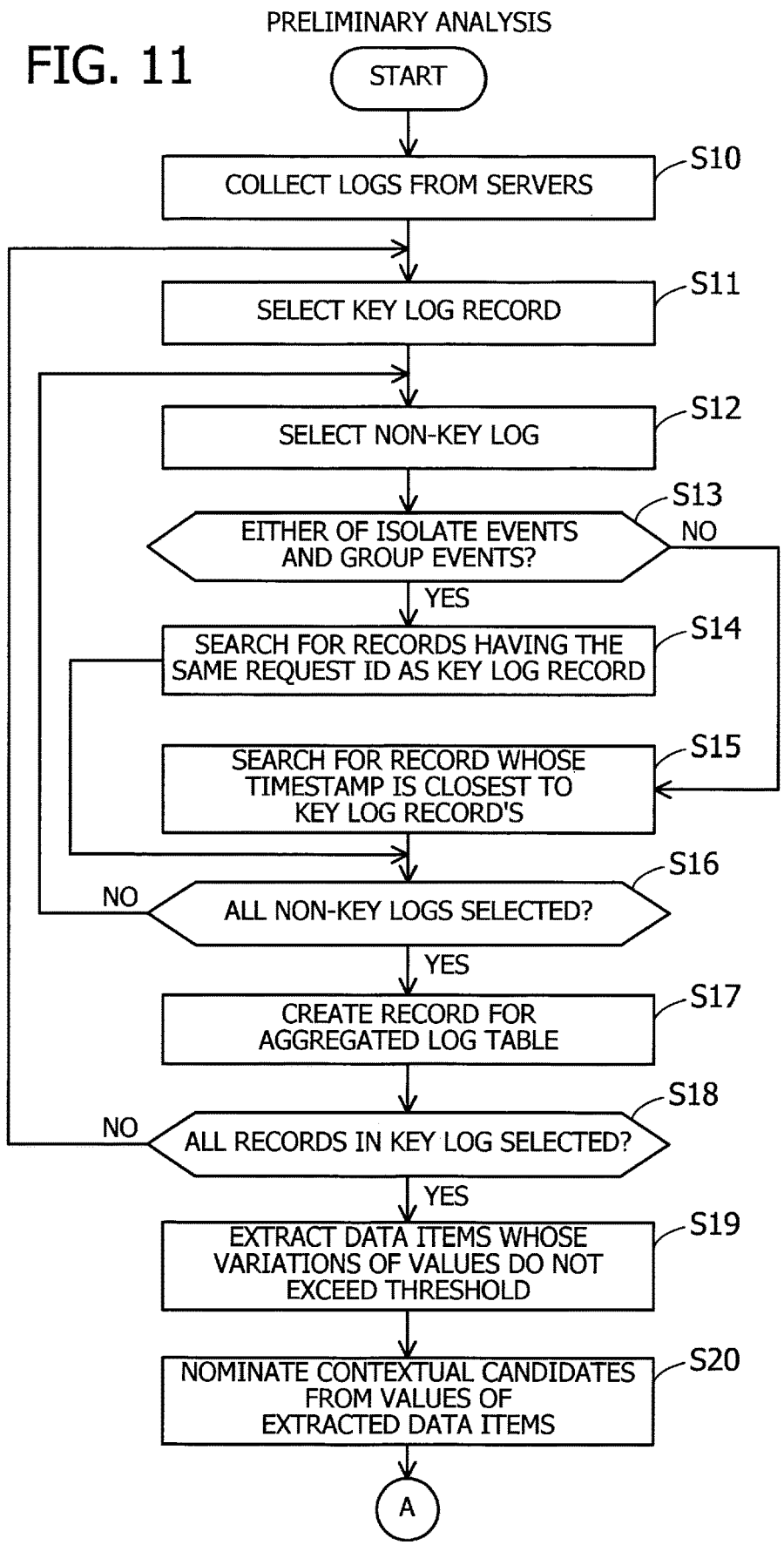
FIGS. 11 to 13 present a flowchart of an example procedure of preliminary analysis.

FIG. 11 presents a flowchart illustrating an example procedure of preliminary analysis. This flowchart includes the following steps:

(S10) The log collection unit 121 collects logs from server computers and stores them in the log storage unit 122. For example, the log collection unit 121 receives a first resource log 135 from the web server 31. The log collection unit 121 also receives an AP access log 132, method log 133, and second resource log 136 from the AP server 32. The log collection unit 121 further receives an SQL log 134 from the database server 33.

(S11) The data aggregation unit 124 identifies a key log with reference to the configuration table 131 and reads it out of the log storage unit 122. For example, the data aggregation unit 124 reads out the AP access log 132 as a key log from the log storage unit 122. The data aggregation unit 124 selects one of the records in the key log, which is referred to as a key log record.

(S12) With reference to the configuration table 131, the data aggregation unit 124 selects a non-key log (one of the logs registered without a key flag) and reads it out of the log storage unit 122.

(S13) With reference to the event type field of the configuration table 131, the data aggregation unit 124 determines what type of events the selected non-key log contains. In the case of isolate events or group events, the process advances to step S14. In the case of regular events, the process skips to step S15.

(S14) The data aggregation unit 124 searches the non-key log selected in step S12 for records that have the same request ID as the key log record selected in step S11.

(S15) The data aggregation unit 124 searches the selected non-key log for a record whose timestamp is the closest to the timestamp of the selected key log record.

(S16) The data aggregation unit 124 determines whether the above step S12 has selected all non-key logs defined in the configuration table 131. If all non-key logs have been selected, the process advances to step S17. If there is any unselected log, the process returns to step S12.

(S17) The data aggregation unit 124 creates an aggregated log record by combining records found in steps S14 and S15 with the key log record selected in step S11 and adds it to the first and second aggregated log tables 137 and 138. Here the data aggregation unit 124 may omit some of the data items in the selected non-key log or may change the names of some data items before registering them in the first and second aggregated log tables 137 and 138. The first aggregated log table 137 does not include timestamps, whereas the second aggregated log table 138 does.

(S18) The data aggregation unit 124 determines whether the above step S11 has selected all records in the key log. If all records have been selected, the process advances to step S19. If there is any unselected record, the process returns to step S11.

(S19) With reference to the first aggregated log table 137, the model formulation unit 125 extracts data items whose variations of values do not exceed a threshold (e.g., 20).

(S20) The model formulation unit 125 nominates a set of contextual candidates by using the values of the data items extracted in step S19. This set of contextual candidates includes a null context (i.e., context that does not limit values in any data item). The set of contextual candidates also include contexts that will limit one data item to a particular value, as well as those that will limit two or more data items respectively to particular values.

Figure 12:
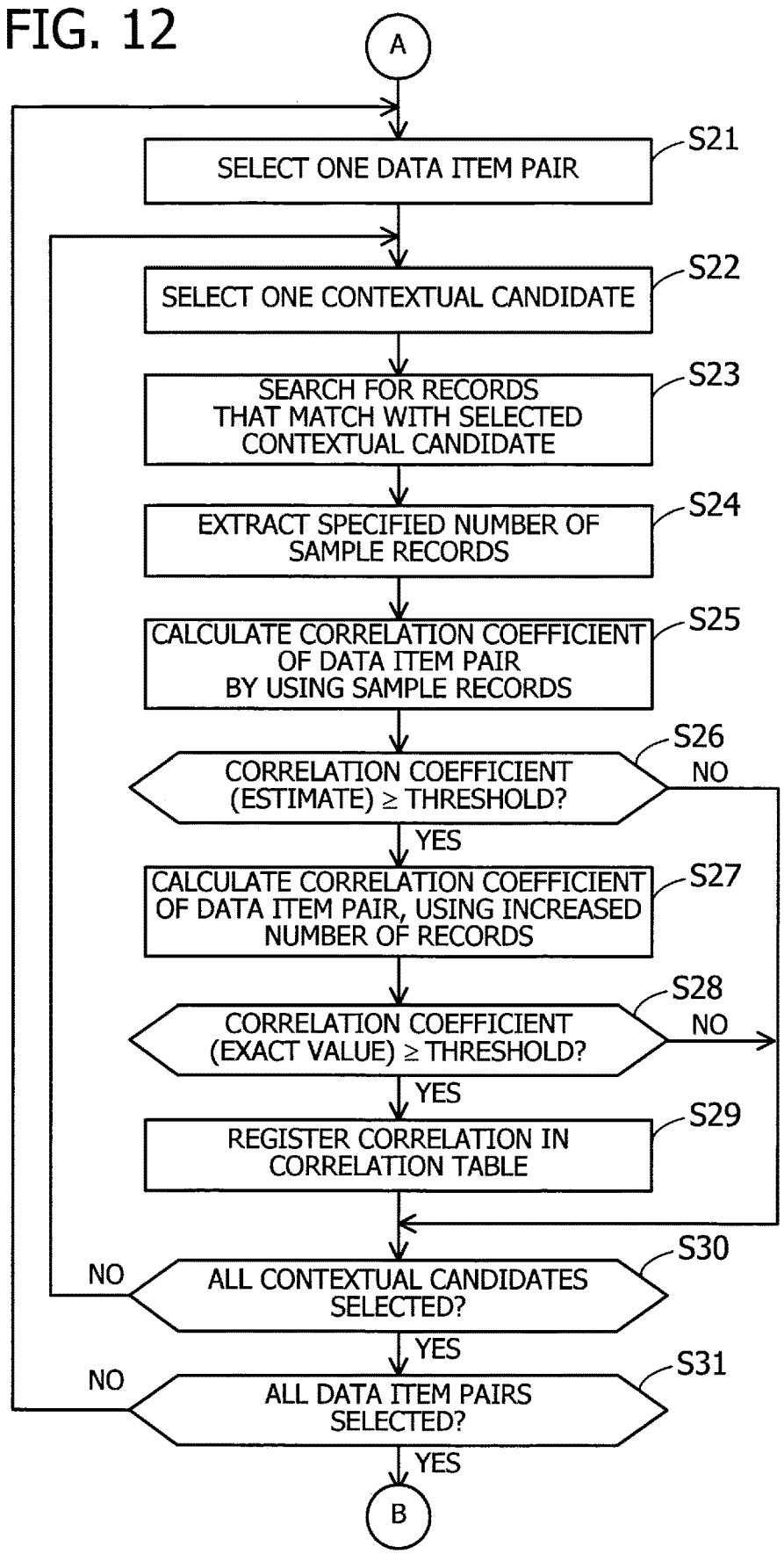

FIG. 12 is a second part of the flowchart illustrating an example procedure of preliminary analysis.

(S21) The model formulation unit 125 selects a data item pair by extracting and combining two data items from the first aggregated log table 137.

(S22) The model formulation unit 125 selects one of the contextual candidates in the set created in step S20.

(S23) The model formulation unit 125 searches the first aggregated log table 137 for records that match with the contextual candidate selected in step S22.

(S24) The model formulation unit 125 randomly extracts a specified number (e.g., 30) of sample records out of the records found in step S23.

(S25) Using the sample records extracted in step S24, the model formulation unit 125 calculates an estimate of correlation coefficient of the data item pair selected in S21.

(S26) The model formulation unit 125 compares the estimate calculated in step S25 with a specified threshold (e.g., 0.6). If the estimated correlation coefficient is greater than or equal to the threshold, the process advances to step S27. If the estimated correlation coefficient is smaller than the threshold, the process proceeds to step S30 without registering the data item pair in the correlation table 141.

(S27) The model formulation unit 125 calculates an exact value of correlation coefficient of the data item pair by using the whole or part of the records found in step S23. The records used in this step S27 are greater in number than the sample records extracted in step S24. For example, the model formulation unit 125 may use the entire set of records found in step S23 to obtain the exact correlation coefficient.

(S28) The model formulation unit 125 compares the exact value of correlation coefficient calculated in step S27 with a specified threshold (e.g., 0.7). If the exact value of correlation coefficient is greater than or equal to the threshold, the process advances to step S29. If the exact value of correlation coefficient is smaller than the threshold, the process proceeds to step S30 without registering the data item pair in the correlation table 141.

(S29) The model formulation unit 125 adds a new entry to the correlation table 141 to register the correlation of the data item pair selected in S21. Specifically, this new entry of the correlation table 141 includes the following information: the names of two data items constituting the data item pair, the contextual candidate selected in step S22, the number of records used in step S27, and the exact value of correlation coefficient calculated in step S27.

(S30) The model formulation unit 125 determines whether the above step S22 has selected all contextual candidates in the set. When all contextual candidates have been selected, the process advances to step S31. When there is any unselected contextual candidate, the process returns to step S22.

(S31) The model formulation unit 125 determines whether the above step S21 has selected all data item pairs. When all data item pairs have been selected, the process advances to step S32. When there is any unselected data item pair, the process returns to step S21.

Figure 13:
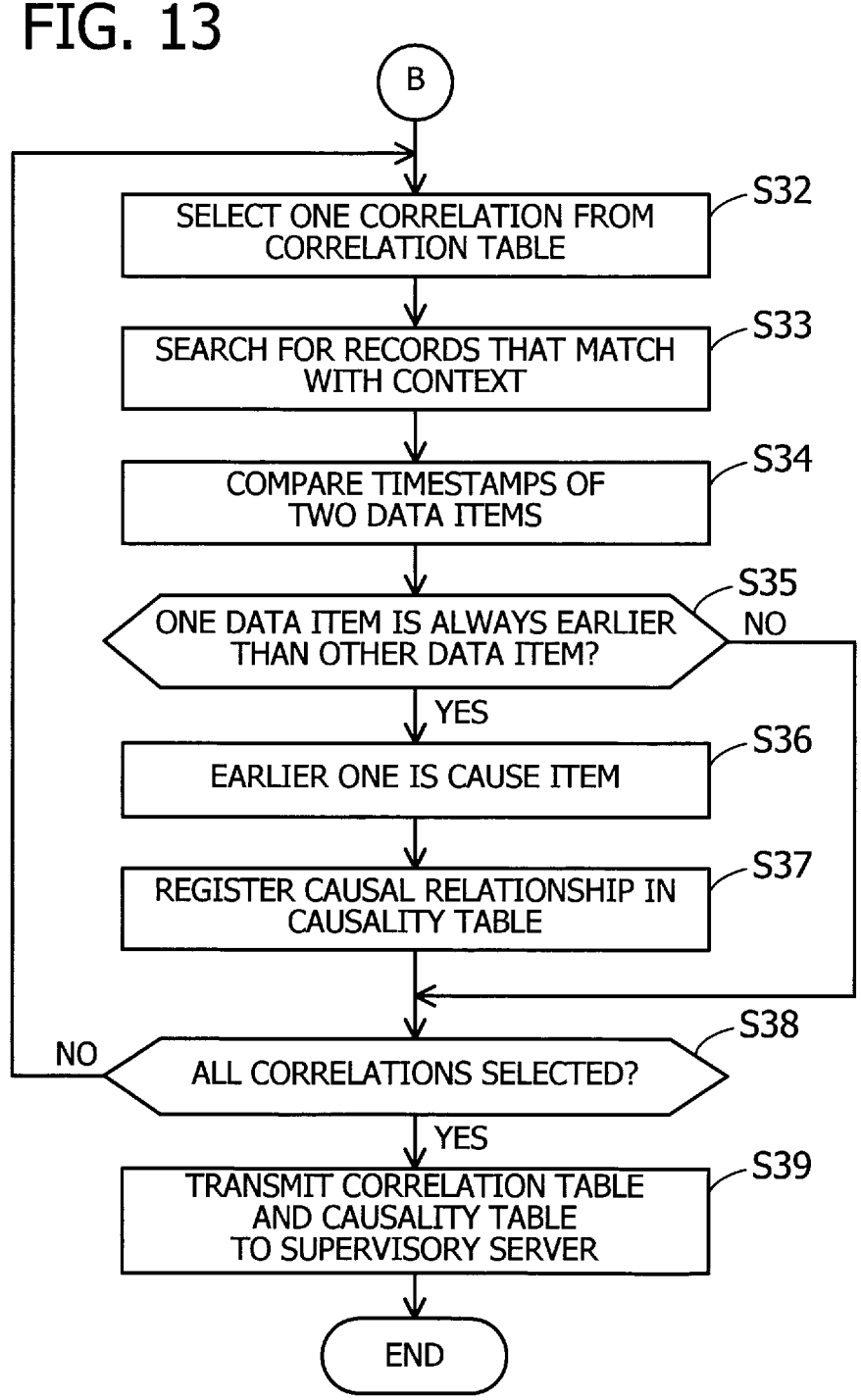

FIG. 13 is a third part of the flowchart illustrating an example procedure of preliminary analysis.

(S32) The causality determination unit 126 selects one correlation (i.e., one record) in the correlation table 141 that the model formulation unit 125 has created above.

(S33) The causality determination unit 126 searches the second aggregated log table 138 for records that match with the context of the correlation selected in step S32.

(S34) From the records found in step S33, the causality determination unit 126 extracts timestamps recorded with respect to data items #1 and #2 of the correlation selected in step S32. The causality determination unit 126 compares the timestamp of data item #1 with the timestamp of data item #2 in each record found in step S33, thus determining whether any regularity exists in those timestamps.

(S35) The causality determination unit 126 determines whether one data item in the data item pair is always earlier than the other data item in the same. If this condition is true, the process advances to step S36. Otherwise, the process skips to step S38. It is noted that the condition is deemed to be false in the case where at least one of the two data items is originated from a regular event log.

(S36) The causality determination unit 126 concludes that the data item having earlier timestamps is the cause item and that the data item having later timestamps is the effect item.

(S37) The causality determination unit 126 acknowledges the presence of a causal relationship in the data item pair of the correlation selected in step S32 and thus registers the relationship in the causality table 142. More specifically, the causality determination unit 126 registers the names of cause item and effect item identified in step S36, as well as the correlation's context selected in step S32. The causality determination unit 126 also adds a causality ID to the correlation table 141 so that the correlation selected in step S32 may be associated with the causal relationship newly registered in the causality table 142.

(S38) The causality determination unit 126 determines whether the foregoing step S32 has selected all correlations from the correlation table 141. When all correlations have been selected, the process advances to step S39. When there is any unselected correlation, the process returns to step S32.

(S39) The model transmission unit 128 transmits the created correlation table 141 and causality table 142 to the supervisory server 200 so that they will be stored in its model storage unit 227.

Figure 14:
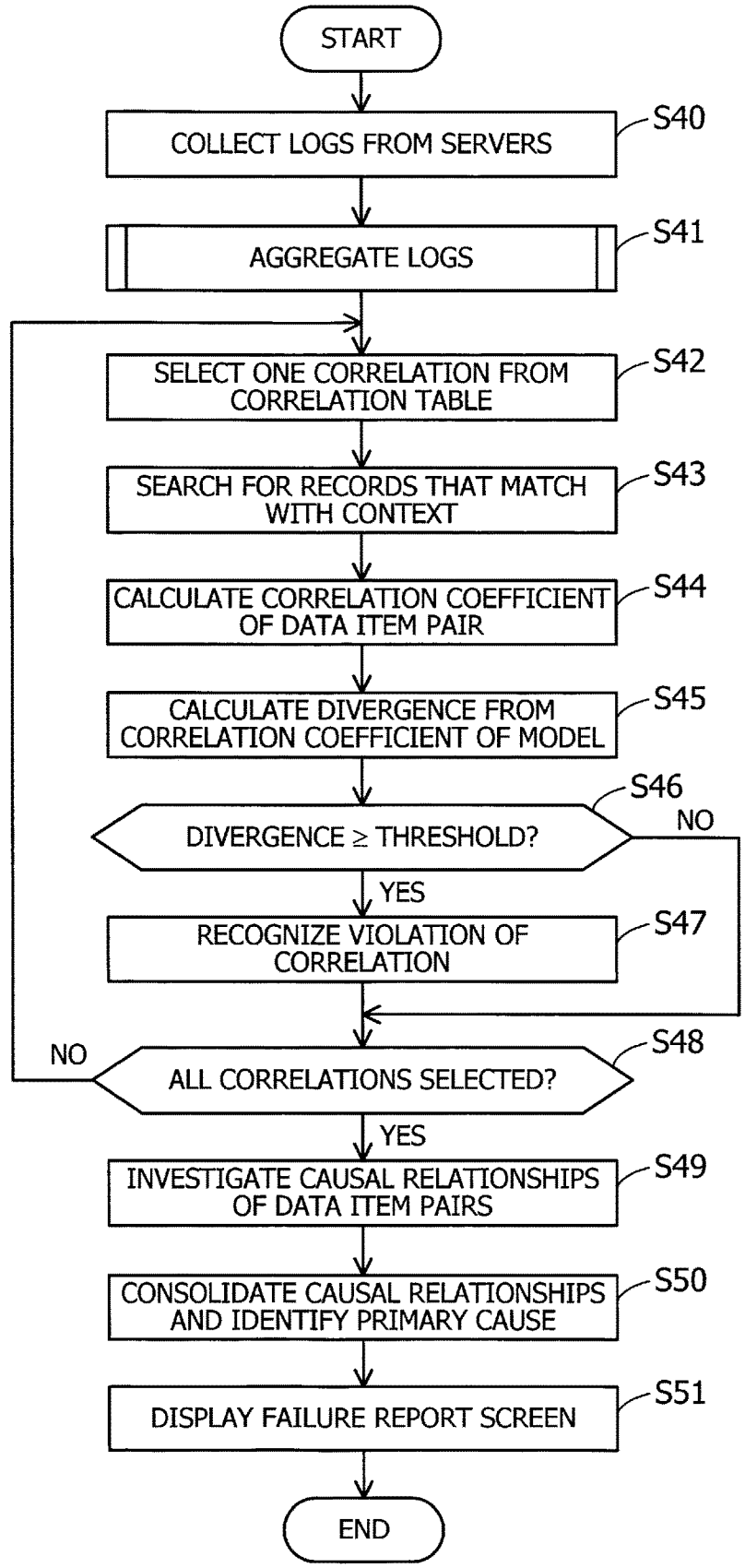
FIG. 14 is a flowchart of an example procedure of operations monitoring.

FIG. 14 is a flowchart of an example procedure of operations monitoring. This flowchart includes the following steps:

(S40) The log collection unit 221 collects logs from servers in the same way as described above in step S10 (see FIG. 11) and stores the collected logs in the log storage unit 222. For example, the log collection unit 221 receives a first resource log from the web server 31. The log collection unit 221 also receives an AP access log, a method log, and a second resource log from the AP server 32. The log collection unit 221 further receives an SQL log from the database server 33.

(S41) The data aggregation unit 224 creates an aggregated log table in the same way as described above in steps S11 to S18. This aggregated log table may omit timestamp information. For details of log aggregation, see the preceding description of steps S11 to S18.

(S42) The model matching unit 225 in the supervisory server 200 selects one of the correlations registered in the correlation table 141 copied to the supervisory server 200. In other words, the model matching unit 225 selects one record of the correlation table 141.

(S43) The model matching unit 225 searches the aggregated log table created in step S41 for records that match with the context of the correlation selected in step S42.

(S44) From the records found in step S43, the model matching unit 225 extracts values of data items that are registered as data items #1 and #2 in the correlation selected in step S42. With the extracted values, the model matching unit 225 calculates the current correlation coefficient between data item #1 and data item #2 constituting the data item pair of interest.

(S45) The model matching unit 225 calculates the divergence of the current correlation coefficient calculated in step S44 from the past correlation coefficient of the correlation selected in step S42. For example, the model matching unit 225 calculates z, on the basis of the foregoing equations (1) and (2), from the past sample size $n_1$, the past correlation coefficient $r_1$, the current sample size $n_2$, and the current correlation coefficient $r_2$. Here the absolute value of z indicates the divergence.

(S46) The model matching unit 225 compares the divergence calculated in step S45 with a specified threshold. For example, the model matching unit 225 compares the absolute value of z with a threshold of 1.96 on the basis of equation (3) discussed above. If the divergence is greater than or equal to the threshold, the process advances to step S47. If the divergence is smaller than the threshold, the process skips to step S48.

(S47) The model matching unit 225 recognizes that the data item pair indicated by the correlation selected in step S42 is experiencing violation of correlation.

(S48) The model matching unit 225 determines whether the foregoing step S42 has selected all correlations registered in the correlation table 141. When all correlations have been selected, the process advances to step S49. When there is any unselected correlation, the process returns to step S42.

(S49) The causality searching unit 226 searches the causality table 142 for a causal relationship of each correlation-violated data item pair that has been detected in step S47. For example, the causality searching unit 226 obtains a causality ID corresponding to one correlation from the correlation table 141 and then picks up a relevant record from the causality table 142 by using the obtained causality ID as a key. In the case where no corresponding causality ID exists in the correlation table 141, the causality searching unit 226 concludes that the data item pair concerned does not have a particular causal relationship.

(S50) When violation is detected in multiple correlations, the causality searching unit 226 sorts these correlations into groups on the basis of their contexts, so that correlations sharing a context will form a group. The causality searching unit 226 then identifies the main cause of failure in each individual group by consolidating causal relationships corresponding to the member correlations of a group.

(S51) The failure reporting unit 228 transmits a failure report to the management console 34. This failure report includes the names of data items constituting each correlation-violated data item pair, statistics of those data items in the latest logs, and the contexts used to detect violation. The failure report may also include information that indicates which data item is the primary cause of failure. Upon receipt of the failure report, the management console 34 displays a failure report screen 231 based thereon.

The proposed information processing system according to the second embodiment has been described above. In operation, the analysis server 100 aggregates multiple logs collected from server computers such that a set of related log records will be combined together. The analysis server 100 calculates a correlation coefficient with respect to each combination of a data item pair and its context that appear in the aggregated log and extracts correlations whose correlation coefficients are high. The extracted correlations are subjected to a process of estimating causal relationships of data item pairs on the basis of timestamps included in the aggregated log. The supervisory server 200 may discover violation of correlation in the latest logs. When the discovered violation extends over multiple correlations, the supervisory server 200 identifies and displays the primary cause (i.e., the data item closest to the cause of failure), based on previously estimated causal relationships between different data items.

The proposed system makes it possible to detect a failure without the need for manually defining what pattern of log records suggests presence of failure. Because correlation coefficients are calculated from log records under a limited context, the proposed method extracts data items that exhibit a high correlation only in particular conditions, thus improving the accuracy of failure detection. The proposed method also estimates beforehand the causal relationships between data items. This feature improves the accuracy of determining which data items are closer to the cause of failure even in the case where two or more correlations are violated simultaneously. The proposed method further provides useful information for troubleshooting. The administrator therefore is able to investigate the problem more efficiently by giving priority to data items closer to the cause of failure.

Several embodiments and their variations have been discussed above. In one aspect, the proposed techniques enable more accurate determination of data items that are close to the cause of failure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing therein an analyzing program that causes a computer to execute a process comprising:

collecting a first log including a plurality of first records corresponding to a plurality of first processing events and a second log including a plurality of second records corresponding to a plurality of second processing events, each of the plurality of first records including a first data item that indicates a value pertaining to one of the plurality of first processing events and a first chronological item that indicates an occurrence time of the one of the plurality of first processing events, each of the plurality of second records including a second data item that indicates a value pertaining to one of the plurality of second processing events and a second chronological item that indicates an occurrence time of the one of the plurality of second processing events;

calculating a first correlation between the first data item and the second data item by comparing, for each of two or more first records in the first log, a value of the first data item included in the first record and a value of the second data item included in a second record corresponding to the first record in the second log;

determining a first influence direction between the first data item and the second data item by comparing, for each of the two or more first records, a value of the first chronological item included in the first record and a value of the second chronological item included in the second record corresponding to the first record;

collecting a third log including a plurality of third records each including the first data item and a fourth log including a plurality of fourth records each including the second data item, the third log being generated later than the first log, the fourth log being generated later than the second log; and determining whether the first correlation holds with respect to the first data item and the second data item by comparing, for each of two or more third records in the third log, a value of the first data item included in the third record and a value of the second data item included in a fourth record corresponding to the third record in the fourth log, and outputting an anomaly report when the first correlation does not hold, the anomaly report indicating which of the first data item and second data item is a cause data item, the cause data item being a source of an anomaly and determined based on the first influence direction.

2. The non-transitory computer-readable storage medium according to claim 1, wherein:

the process further includes calculating a second correlation between the second data item and a third data item, and determining a second influence direction between the second data item and the third data item; and the outputting of an anomaly report includes determining, based on the first influence direction and the second influence direction, that one of the first data item, second data item, and third data item is the cause data item, whichever is an initial source of influence, when neither the first correlation nor second correlation holds.

3. The non-transitory computer-readable storage medium according to claim 1, wherein:

each of the plurality of first records or each of the plurality of second records includes a third data item; and the calculating of a first correlation includes detecting a conditional correlation as the first correlation, based on associations among a value of the first data item, a value of the second data item, and a value of the third data item, the conditional correlation being observed between the first data item and the second data item only when the value of the third data item satisfy a specific condition.

4. An analyzing apparatus comprising:

a memory configured to store therein a first log including a plurality of first records corresponding to a plurality of first processing events and a second log including a plurality of second records corresponding to a plurality of second processing events, each of the plurality of first records including a first data item that indicates a value pertaining to one of the plurality of first processing events and a first chronological item that indicates an occurrence time of the one of the plurality of first processing events, each of the plurality of second records including a second data item that indicates a value pertaining to one of the plurality of second processing events and a second chronological item that indicates an occurrence time of the one of the plurality of second processing events; and a processor configured to perform a process including:

calculating a first correlation between the first data item and the second data item by comparing, for each of two or more first records in the first log, a value of the first data item included in the first record and a value of the second data item included in a second record corresponding to the first record in the second log, determining a first influence direction between the first data item and the second data item by comparing, for each of the two or more first records, a value of the first chronological item included in the first record and a value of the second chronological item included in the second record corresponding to the first record, collecting a third log including a plurality of third records each including the first data item and a fourth log including a plurality of fourth records each including the second data item, the third log being generated later than the first log, the fourth log being generated later than the second log, and determining whether the first correlation holds with respect to the first data item and the second data item by comparing, for each of two or more third records in the third log, a value of the first data item included in the third record and a value of the second data item included in a fourth record corresponding to the third record in the fourth log, and outputting an anomaly report when the first correlation does not hold, the anomaly report indicating which of the first data item and second data item is a cause data item, the cause data item being a source of an anomaly and determined based on the first influence direction.

5. An analyzing method comprising:

collecting, by a processor, a first log including a plurality of first records corresponding to a plurality of first processing events and a second log including a plurality of second records corresponding to a plurality of second processing events, each of the plurality of first records including a first data item that indicates a value pertaining to one of the plurality of first processing events and a first chronological item that indicates an occurrence time of the one of the plurality of first processing events, each of the plurality of second records including a second data item that indicates a value pertaining to one of the plurality of second processing events and a second chronological item that indicates an occurrence time of the one of the plurality of second processing events;

calculating, by the processor, a first correlation between the first data item and the second data item by comparing, for each of two or more first records in the first log, a value of the first data item included in the first record and a value of the second data item included in a second record corresponding to the first record in the second log;

determining, by the processor, a first influence direction between the first data item and the second data item by comparing, for each of the two or more first records, a value of the first chronological item included in the first record and a value of the second chronological item included in the second record corresponding to the first record;

collecting, by the processor, a third log including a plurality of third records each including the first data item and a fourth log including a plurality of fourth records each including the second data item, the third log being generated later than the first log, the fourth log being generated later than the second log; and determining, by the processor, whether the first correlation holds with respect to the first data item and the second data item by comparing, for each of two or more third records in the third log, a value of the first data item included in the third record and a value of the second data item included in a fourth record corresponding to the third record in the fourth log, and outputting an anomaly report when the first correlation does not hold, the anomaly report indicating which of the first data item and second data item is a cause data item, the cause data item being a source of an anomaly and determined based on the first influence direction.

* * * * *